April 10, 1962 — E. W. PLESSER — 3,029,365

ELECTRICAL CIRCUIT MEANS

Filed March 5, 1959

INVENTOR.
EDGAR W. PLESSER
BY
Harry W. Hargis III
AGENT

United States Patent Office 3,029,365

Patented Apr. 10, 1962

3,029,365

ELECTRICAL CIRCUIT MEANS

Edgar W. Plesser, Glenside, Pa., assignor, by mesne assignments, to Philco Corporation, Philadelphia, Pa., a corporation of Delaware Filed Mar. 5, 1959, Ser. No. 797,428
4 Claims. (Cl. 317—101)

This invention relates to electrical circuits, and more particularly to both a method of and means for facilitating location, or tracing, of substantially hidden electrical circuits. While of broader applicability, the present invention has particular utility in the art of circuit-bearing panel structure such, for example, as so-called "printed-wiring" panels.

While numerous known advantages derive from using printed wiring in electrical apparatus, difficulties have been encountered when servicing or "trouble-shooting" apparatus of this type, due to the inaccessibility of the printed electrical circuitry disposed upon one side of the panel, and which circuitry interconnects electrical components disposed on the opposite, and normally visible or exposed, side of the panel.

It is a broad objective of the invention to provide means overcoming the above mentioned difficulties.

It is a specific object to provide a method of and means for facilitating the tracing of interconnecting circuits for components mounted on a wiring panel. To this end, preferred practice of the invention contemplates applying directly to one side of a wiring panel an electrically non-conductive replica of the wiring disposed upon the opposite side of the panel.

As respects the illustrated preferred embodiment comprising a printed wiring panel, and in accordance with novel method aspects of the invention, it is contemplated that the same pattern means as is used to apply the circuit-producing material be further employed in applying a circuit-locating replica, each such application being made, sequentially, to predetermined opposite surface portions of the wiring panel.

The manner in which the foregoing objects and advantages may best be achieved will be more fully understood from a consideration of the following detailed description, taken in light of the accompanying drawing in which.

Figures 1, 2, 3, 4, 5, 6:
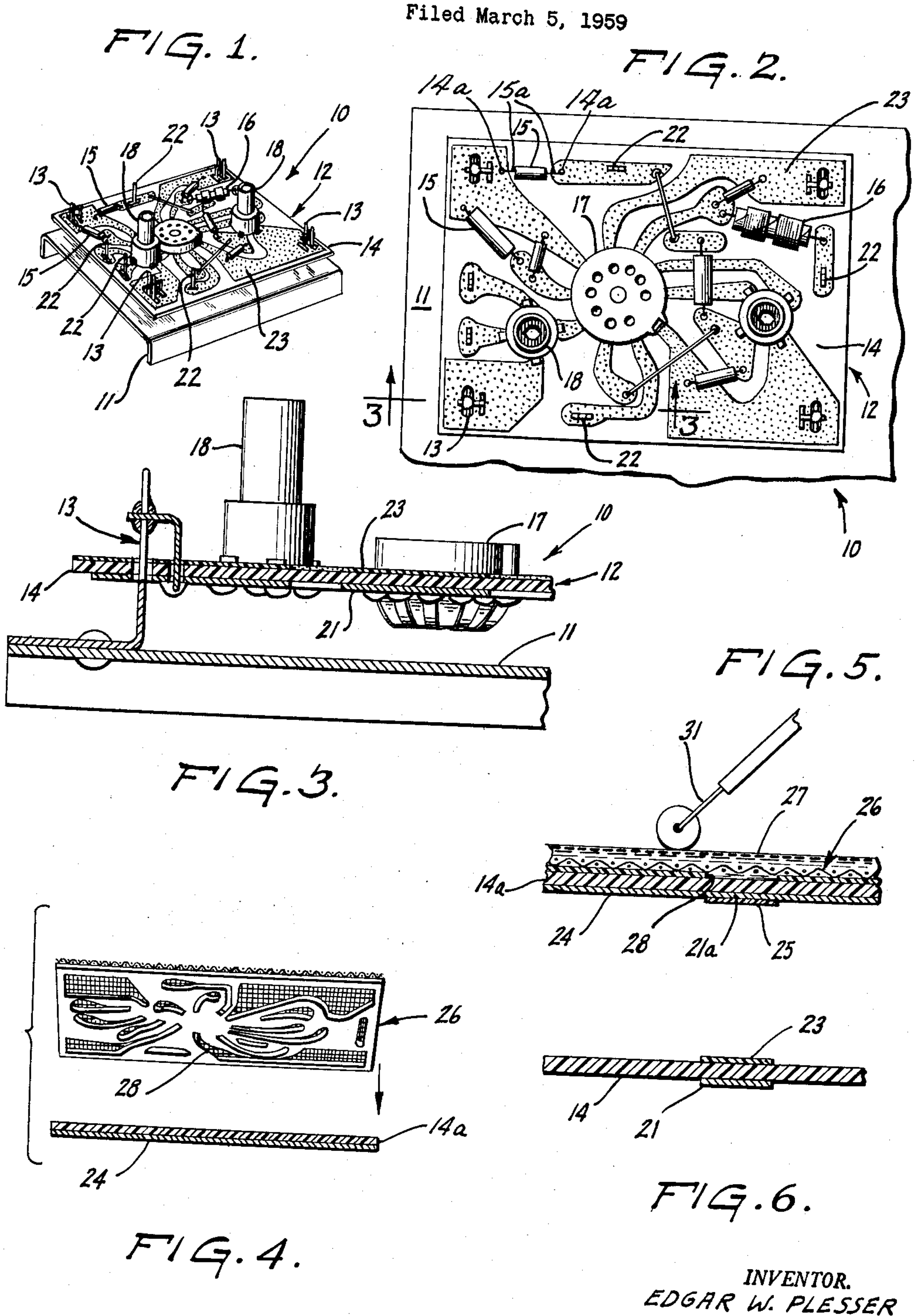
FIGURE 1 is a perspective showing of mounted wiring-panel means of a type wherein the present invention has particular utility.
FIGURE 2 is a somewhat enlarged plan view of the panel means shown in FIGURE 1.
FIGURE 3 is an enlarged sectional showing, in elevation and with parts broken away, looking generally in the direction of arrows 3—3 as applied to FIGURE 2.
FIGURE 4 shows a wiring panel and overlying screen mask, and illustrates a preferred method for carrying out the invention.

FIGURE 5 is an enlarged sectional view similar to the showing of FIGURE 3, but illustrating apparatus for applying circuit and circuit-locating patterns in accordance with the invention, and by means of known silk-screen stenciling process; and FIGURE 6 is an enlarged sectional showing, also similar to FIGURE 3, and further illustrating apparatus made in accordance with the method illustrated in FIGURES 4 and 5.

The invention is featured by provision of visible tracer means for locating intercomponent connections carried by a wiring panel, wherein the tracer means is a permanent part of the equipment. The foregoing as well as other features of the invention are clearly shown in the drawing, with initial reference being made to FIGURES 1, 2, and 3 in which an electrical assembly 10 includes sheet-like, electrically conductive plate means 11. In the preferred embodiment, means 11 may be the metal chassis of a radio or television receiver. An electrical component sub-assembly 12 is supported by the metal chassis, for example by mounting means 13 made in accordance with the disclosure of the copending patent application of Blaine E. Platt, filed November 27, 1957, bearing Serial No. 699,319, now U.S. Patent No. 2,909,710, and assigned to the assignee of the present invention.

The electrical component sub-assembly 12 comprises a sheet-like panel 14 of electrically insulative material, said panel having affixed thereto various electrical components such, for example, as resistors 15, R.F. choke 16, tube socket 17, and I.F. transformer 18 as well as other known electronic circuit components (not identified). These components are electrically connected, one to the other, by suitable circuit means 21 (FIGURE 3) of the so-called printed type, disposed on the side of insulating panel 14 opposite the aforementioned electrical components 15, 16, 17, and 18. The components have suitable terminal means, such for example as seen at 15*a* (FIGURE 2), that extend through openings 14*a* provided in the panel 14 and into electrical contact with the aforementioned circuit means 21. Suitable terminals for circuit means 21 include vertically extending lug means 22, each being adapted electrically to engage conductors (not shown) wrapped around or soldered to the lug, as is known.

As is best seen in FIGURE 3, the side of panel 14 which carries printed wiring circuitry 21 confronts, and closely overlies, a surface portion of chassis 11. By virtue of this arrangement, accessibility to the interconnecting circuitry comprising the printed wiring 21 is extremely difficult, and in most instances is impossible unless the panel is removed from the chassis. Removal of panel 14 is, of course, not always desirable, inasmuch as a panel of this type normally comprises component assemblies necessary to the operation of the entire apparatus and which, accordingly, must remain in place in the performance of certain known service procedures.

In particular accordance with the present invention, and referring further to FIGURES 1 to 3, there is applied to the upwardly presented or component-bearing surface of panel 14, a pattern preferably inked and of non-conductive material, designated generally by the numeral 23, which contrasts visibly with adjacent surface portions of the panel and directly overlies the circuitry 21 (see also FIGURE 6). Since this pattern is a replica of the underlying circuit, it precisely locates said circuits 21 disposed to the opposite, substantially hidden, lower, side of the panel. Also, it will be noted that the terminal means 15*a* extend through each of the replicas in regions thereof corresponding to those regions of the printed wiring circuits which the terminal means are connected. Thus each terminal means is directly identified with its corresponding circuit 21. Tracing the underlying circuit becomes simplicity itself.

While the complete extent and disposition of the current carrying circuits 21 has not been shown in the drawing, it will be understood that in the illustrated embodiment, the circuits 21 would be a mirror image of the non-conductive replica shown at 23 in FIGURE 2. This complete correspondence in shape and position can also be seen by comparing the layers 21 and 23 (FIGURE 6), and those portions shown in cross-hatching and in full lines in FIGURE 3.

FIGURES 4, 5 and 6 illustrate the method of the invention, and each step of the method is performed in accordance with known screen printing techniques. The method comprises applying an acid resist pattern 25, as provided by silk screen stencil, or pattern, 26, to the metal coated surface 24 of a panel blank 14*a*. Following application of the acid resist pattern 25, the same silk screen stencil 26 is turned edge-for-edge, as is the panel. As seen in FIGURES 4 and 5, the turned stencil is then applied to the upper surface of turned panel 14*a* in such manner that each opening 28 of the pattern 26 corresponds directly to the acid resist pattern 25 laid down thereby on the opposite side of the panel (see FIGURE 5). A non-conductive ink is then rolled onto the stencil-screen, and forced through openings 28 thereof, by roller 31 to apply the replica 23 (FIGURES 1, 2, and 3) of the wiring circuit 21 to the normally visible, component-carrying side of the insulating panel. The exact registry of the replica 23 with the circuit 21 is clearly seen in FIGURE 6, where undesired portions of metal 24 have been etched away and the resist 25 is removed.

It will be appreciated, in light of the foregoing, that novel and simple means is provided for locating normally inaccessible electrical circuits. In the apparatus aspect of the invention the means for locating are incorporated in the circuit bearing structure itself and are associated directly with the appropriate circuits, including their terminals, to such a degree as to render them readily identifiable.

As respects the method, the steps thereof are readily performed in the course of fabricating a circuit component, using the same apparatus as is used in production of the circuit. The invention of course is seen to minimize the need for separate wiring diagrams, inasmuch as the diagram is part of the equipment per se.

While a preferred embodiment of the invention has been illustrated, it will be understood that such modifications are contemplated as fall within the scope of the appended claims.

I claim:

1. An integrally formed electrical component assembly and circuit diagram therefor, comprising: electrically non-conductive panel means having oppositely disposed surface portions; a plurality of spaced electrical component means disposed to one side of said panel means adjacent surface portions thereof and having electrical terminal means extending through said panel means into the region of the opposite surface portion; electrical circuit means comprising a plurality of printed wiring elements, each extending over said opposite surface portion, said circuit means being disposed in electrical contact with said component terminal means; and an electrically non-conductive replica of each said printed wiring element, each replica being directly adherent to surface portions of said panel means presented toward said component means, and adapted to locate the paths of said printed wiring elements when said panel means is viewed from the component side.

2. An integrally formed electrical component assembly and circuit diagram therefor, comprising: electrically non-conductive panel means having oppositely disposed surface portions; electrical circuit means comprising a plurality of printed wiring elements, each extending over a surface portion of said panel means; an electrically non-conductive replica of each said printed wiring element, each said replica being directly adherent to surface portions of said panel means opposite surface portions of said panel means to which said circuit means is adherent, and adapted to locate the paths of said printed wiring elements when said panel means is viewed from the side of the panel means opposite the wiring elements; and a plurality of spaced electrical component means disposed to the side of said panel means upon which said replica is disposed, said component means having electrical terminal means extending through each of said replicas and said panel means into electrical contact with said printed wiring elements in regions corresponding to those regions of said replicas through which said terminal means extend.

3. In the manufacture of circuit components of the type including an electrical conductor formed upon an insulating base, the steps comprising: stencil screening a pattern of resist material upon a metal layer provided on such a base to mask those areas of the base on which electrical conductors are desired; utilizing the same stencil pattern to screen an electrically non-conductive material upon portions of said base directly opposite the said areas to which resist material is screened thereby providing indication of the locations of the electrical conductors when the panel is viewed from the side devoid of such conductors; and providing openings for the passage of electrically conducting elements through said insulating base between portions of the stencil pattern disposed to one side of the base and the corresponding electrical circuitry disposed to the other side of the base.

4. In the manufacture of circuit components of the type including an electrical conductor formed upon an insulating base, the steps which comprise: stencil screening a pattern of resist material upon a metal layer provided on such a base to mask those areas of the base on which electrical conductors are desired; and utilizing the same stencil pattern to screen an electrically non-conductive material upon portions of said base directly opposite the said areas to which resist material is screened, thereby providing indication of the locations of the electrical conductors when the panel is viewed from the side devoid of such conductors.

References Cited in the file of this patent

UNITED STATES PATENTS

| | | |
|---|---|---|
| 1,968,039 | Hornberger | July 31, 1934 |
| 2,699,424 | Nieter | Jan. 11, 1955 |
| 2,777,193 | Albright | Jan. 15, 1957 |
| 2,804,607 | Nalle | Aug. 27, 1957 |
| 2,857,558 | Fiske | Oct. 21, 1958 |
| 2,876,393 | Tally | Mar. 3, 1959 |
| 2,883,447 | Dahl | Apr. 21, 1959 |
| 2,909,710 | Platt | Oct. 20, 1959 |